United States Patent
Parker et al.

(10) Patent No.: US 10,055,507 B2
(45) Date of Patent: Aug. 21, 2018

(54) INFINITE SCROLLING

(71) Applicant: Facebook, Inc., Menlo Park, CA (US)

(72) Inventors: Stefan Parker, Portola Valley, CA (US); Samuel Odio, Mountain View, CA (US); Adam Mosseri, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 0 days.

(21) Appl. No.: 15/664,448

(22) Filed: Jul. 31, 2017

(65) Prior Publication Data
US 2017/0329862 A1 Nov. 16, 2017

Related U.S. Application Data

(63) Continuation of application No. 12/833,901, filed on Jul. 9, 2010, now Pat. No. 9,754,043.

(51) Int. Cl.
  *G06F 17/00* (2006.01)
  *G06F 17/30* (2006.01)
  *G06F 3/0485* (2013.01)

(52) U.S. Cl.
  CPC ...... *G06F 17/30899* (2013.01); *G06F 3/0485* (2013.01)

(58) Field of Classification Search
  CPC ............. G06F 17/30899; G06F 3/0485; G06F 17/2247
  See application file for complete search history.

(56) References Cited

U.S. PATENT DOCUMENTS

| | | | |
|---|---|---|---|
| 8,887,085 B1* | 11/2014 | Cox | G06F 3/04855 715/786 |
| 2006/0242603 A1* | 10/2006 | Wong | G06F 3/0482 715/853 |
| 2007/0136268 A1* | 6/2007 | Qureshi | G06F 17/3089 |
| 2010/0299620 A1* | 11/2010 | Sharma | G06F 17/2247 715/760 |

* cited by examiner

*Primary Examiner* — Andrew T McIntosh
(74) *Attorney, Agent, or Firm* — Baker Botts L.L.P.

(57) ABSTRACT

In one embodiment, a computing device may receive a structured document that includes a list of markers and place-marker elements corresponding to data objects of the structured document. Each marker in the list of markers corresponds to a subset of the place-marker elements. Without loading all the data objects, the device may determine a size of a scroll bar for a GUI based on size information associated with the place-marker elements. In response to detecting a scroll or resize event, an event handler may identify at least one marker in the list of markers whose corresponding subset of place-maker elements is within a portion of the structured document that is viewable through the graphical user interface. The handler may load the data objects corresponding to the subset of the place-marker elements corresponding to the identified marker. The identified marker may then be removed from the list of markers.

20 Claims, 5 Drawing Sheets

INFINITE SCROLLING

PRIORITY

This application is a continuation under 35 U.S.C. § 120 of U.S. patent application Ser. No. 12/833,901, filed 9 Jul. 2010.

TECHNICAL FIELD

The present disclosure relates generally to rendering structured documents (such as web pages) and, more particularly, to efficiently rendering structured documents with embedded objects by using place markers inside the structured documents for the embedded objects and retrieving the embedded objects in the structured documents incrementally.

BACKGROUND

Many web pages contain a large number of embedded objects. For example, a photo album page in a social networking or photo sharing site can have dozens (if not hundreds) of photos, comments about the photo album from other users, and sidebar items like friends suggestion, links to other photo albums and advertisements.

When a user views a web page with a large number of embedded objects in the web page, the web browser displays only the embedded objects in the top portion of the web page. The embedded objects in the rest of the web page are fully displayed only when the user scrolls down the web page. Some web sites have modified the web page to detect scrolling and display the embedded objects when the user scrolls. This improves the speed of rendering the web page and the user's experience with the web page, as the embedded objects are not rendered unless the user scrolls down to view them. However, the scroll bar of the web browser does not accurately reflect the full length of the web page as the scroll bar only accounts for the portion of the web page that is fully rendered at any given time. That is, as the newly retrieved objects are embedded in the page, the overall size of the web page changes, which causes the size and location of either or both of the horizontal and vertical scroll bars to change.

SUMMARY

Particular embodiments relate to efficiently rendering a structured document with embedded objects by using place markers in the structured document for a subset of the embedded objects and retrieving the embedded objects in the structured documents incrementally in response to user input. The place markers include one or more attributes that cause the full size of the structured document to be determined and rendered such that the scroll bar of a client application that displays the structured document does not change as new embedded objects are added into the structured document. These and other features, aspects, and advantages of the disclosure are described in more detail below in the detailed description and in conjunction with the following figures.

DETAILED DESCRIPTION

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A web application is an application that may be accessed via a web browser or other client application over a network, or a computer software application that is coded in a web browser-supported language and reliant on a web browser to render the application executable. Web applications have gained popularity largely as a result of the ubiquity of web browsers, the convenience of using a web browser launched at a remote computing device as a client (sometimes referred to as a thin client), and the corresponding ability to update and maintain web applications without distributing and installing software on remote clients. Often, to implement a web application, the web application requires access to one or more resources provided at a backend server of an associated website. Additionally, web applications often require access to additional resources associated with other applications.

A resource or page, which may itself include multiple embedded resources, may include data records, such as content plain textual information, or more complex digitally encoded multimedia content, such as software programs or other code objects, graphics, images, audio signals, videos, and so forth. One prevalent markup language for creating web pages is the Hypertext Markup Language (HTML). Other common web browser-supported languages and technologies include the Extensible Markup Language (XML), the Extensible Hypertext Markup Language (XHTML), JavaScript, Cascading Style Sheet (CSS), and, frequently, Java. By way of example, HTML enables a page developer to create a structured document by denoting structural semantics for text and links, as well as images, web applications and other objects that can be embedded within the page. Generally, a web page may be delivered to a client as a static document, however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

JavaScript is an example of a scripting language that enables various web applications to access resources within other applications for use on the client side of a user session to enable an interactive or dynamic user session when accessing a website. AJAX (shorthand for Asynchronous JavaScript and XML) refers to a group of interrelated techniques used on the client side of a user session to enable more interactive and rich internet applications. Utilizing JavaScript or AJAX, a web application can transmit requests for resources to the backend servers of the website or other resource providers external to the website in order to retrieve the resources asynchronously in the background operations of the client without interfering with the display and behavior of the currently-rendered page. More particularly, when using AJAX, resources are usually retrieved by transmitting an XMLHttpRequest (XHR) object to the resource provider. An XHR is a document object model (DOM) application programming interface (API) that can be used with a web browser scripting language (e.g., JavaScript) to send, for example, an HTTP or HTTPS request for a resource directly to a web server and load the resource retrieved from the server in response to the request directly back into the scripting language code. Once the resource is within the code, the resource may then be available as, by way of example, an HTML or XML document or plain text. In this manner, the retrieved resource may be used to manipulate the currently active document rendered by the web browser without requiring the client to load a new webpage document. In some example embodiments, if the resource is retrieved as plain text, the plain text may be formatted in JavaScript Object Notation (JSON) by the server and evaluated within JavaScript to create an object of data for use on the current DOM.

Figure 1A:
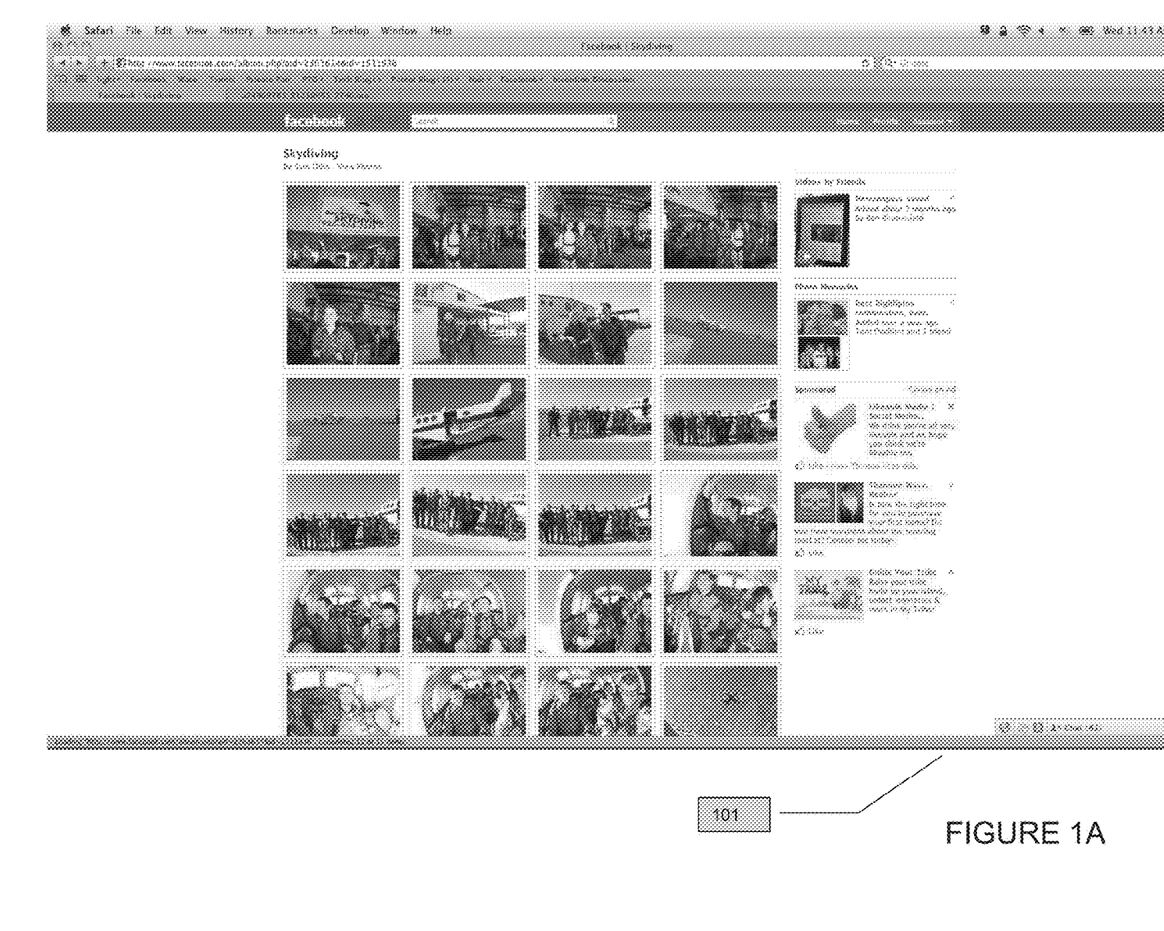
FIGS. 1A and 1B illustrate an example of a photo album web page.
Figure 1B:
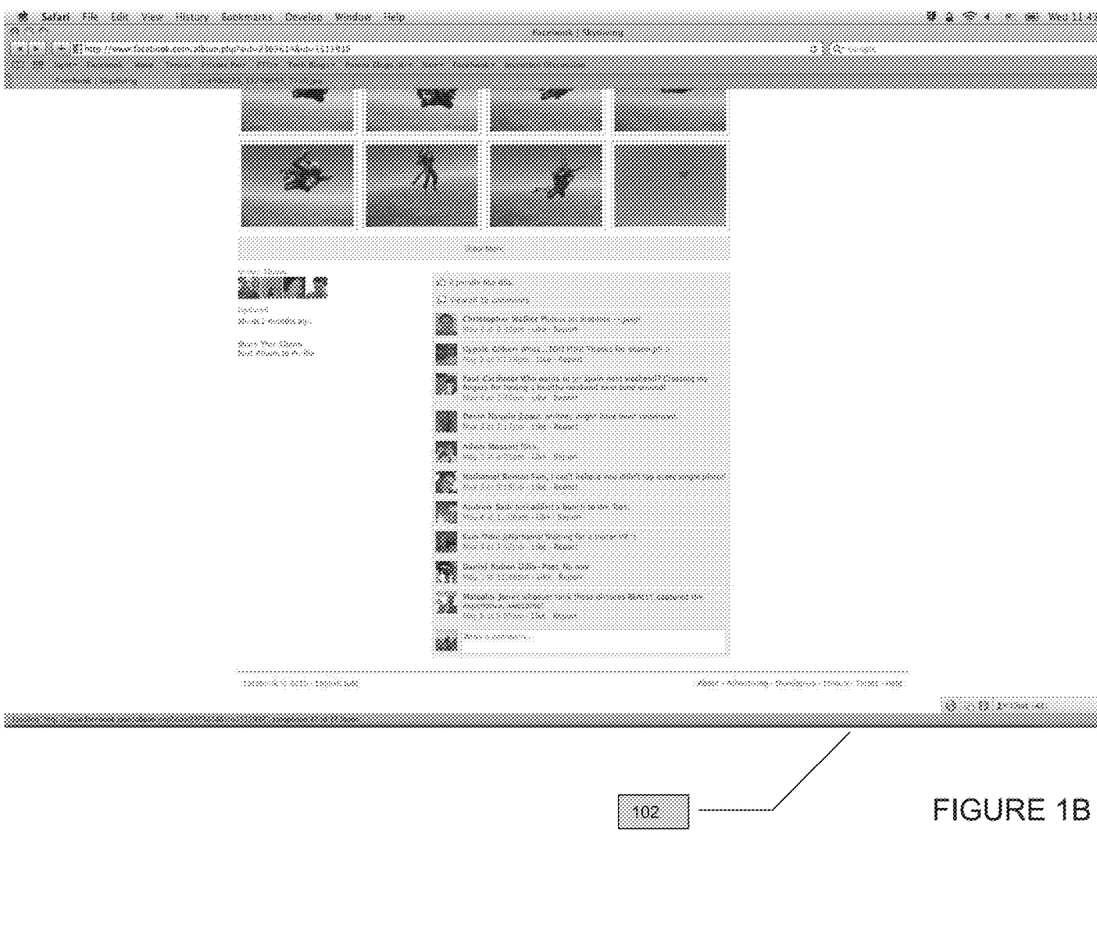

FIGS. 1A and 1B illustrate an example of a photo album web page that incorporates an embodiment of the present invention. The photo album web page contains many embedded objects, e.g., dozens of photos, comments to the photos, and side-bar items like video links, friend suggestions and advertisements. Embedded objects may be multimedia objects, such as images, videos and the like. Portion 101 shows the top portion of the page, and portion 102 shows the bottom portion of the page. Utilizing JavaScript or AJAX, the content of a web page can be loaded and rendered dynamically. For example, when a user viewing a web page in a web browser window with a large number of embedded objects in the web page (e.g, the photo album web page in FIGS. 1A and 1B), only the embedded objects in the top portion of the web page may be retrieved by the web browser and fully rendered in connection with the initial page load. The embedded objects in the rest of the web page are retrieved and rendered only when the user scrolls down the web page. This improves the initial speed of loading the web page and the user's experience with the web page. However, the scroll bar of the web browser does not accurately reflect the full length of the web page as the scroll bar only accounts for the portion of the web page that is fully rendered. Accordingly, as new objects are retrieved and rendered in the web page, the size and location of a scroll bar of the browser will change. Particular embodiments of the invention simulate to a user the full retrieval and rendering of a web page that includes multiple embedded objects, while still obtaining the advantages associated with incrementally retrieving the embedded objects. In particular embodiments, place markers in a web page with embedded objects may enable the web browser to load the web page with the correct scroll bar for the fully loaded page while only rendering the embedded objects that are viewable inside the web browser window.

Figure 2:
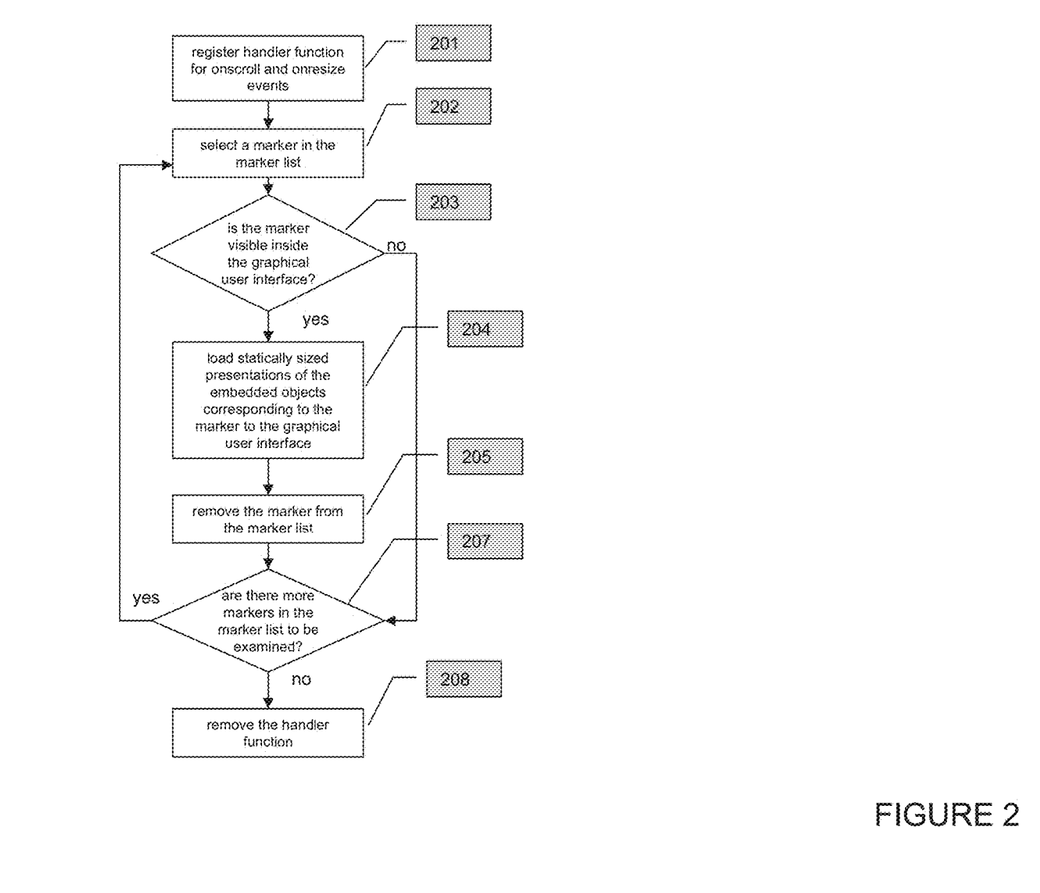
FIG. 2 illustrates an example method for rendering a structured document in a graphical user interface with place markers.

FIG. 2 illustrates an example method for rendering a structured document in a graphical user interface with place markers. In particular embodiments, a user may view a structured document in a graphical user interface of a client application. In particular embodiments, the client application may be a web browser and the graphical user interface may be a web browser window. In particular embodiments, the structured document may be a web page written in web browser-supported languages (e.g., HTML, JavaScript, or CSS). In particular embodiments, the structured document may include embedded objects (e.g., photos, videos, or other media or code objects). In one embodiment, the embedded object may be any visual representation with a fixed object size such as a photo, video thumbnail, or icon. Etc. The structured document also includes an executable code object, such as a Javascript object, that executes the method of FIG. 2 to respond to events and dynamically load embedded objects into the structured document for rendering by the client application.

In particular embodiments, the structured document may include place markers. In particular embodiments, the place markers are HTML <div> elements, or separate elements of a table, having attributes that cause the final size of the structured document to be determined on initial page load even though only a subset of the embedded objects of the page have been retrieved and rendered. In particular embodiments, each place marker may correspond to an embedded object in the structured document. In particular embodiments, the structured document may have a marker list of one or more select place markers, and each marker in the marker list may correspond to a sub-set of the place markers or the embedded objects. For example, each marker in a marker list can correspond to 4, 10 or 20 place markers for embedded photos in a web page. In one implementation, the grouping of place markers associated with a marker can be based on the layout of the structured document. For example, a marker can correspond to each row of photos (i.e., every 4 embedded objects) in the web page shown in FIGS. 1A and 1B. Accordingly, if there are 100 embedded photos in the web page, then the web page has a marker list of 25 markers. In another embodiment, a marker can be identified by including a flag or other element in the place marker code segment. In another embodiment, a marker is a reference to select place marker element in the structured document (such as the first embedded object in a row of embedded objects) and stored in the marker list as part of a code object, such as a Javascript handler function described below.

In particular embodiments, the client application may load the structured document and render only the top portion of the structured document in the graphical user interface, while the scroll bar of the graphical user interface shows as if the client application has loaded the full content of the structured document. For example, a web browser load a web page of 100 photos, in conjunction with place markers in the web page, the web browser renders only the first 20 photos in the web browser window, while showing a scroll bar as if all of the 100 photos has been loaded by the web browser. The structured document on initial page load, in such as embodiment, has actual source attribute references to the first 20 photos (causing them to be loaded on initial page load) and place markers for the remaining embedded objects.

In particular embodiments, the user may resize the graphical user interface or scroll down or across the web page using the scroll bar of the graphical user interface. In particular embodiments, the user's action in resizing and scrolling down the graphical user interface may create HTML events "onResize" and "onScroll". In particular embodiments, on the initial page load, a code object embedded in the page registers a handler function for the "onResize" and "onScroll" events generated by a client application when a user resizes the application window or uses a scroll bar (201). The code object also executes the handler function either before or after registering the handler function in response to the initial page load (202). In particular embodiments, the handler function may also be implemented in JavaScript.

The remaining operations shown in FIG. 2 illustrate operations of the handler function initiated in connection with an initial page load or in response to an onResize or onScroll event. In particular embodiments, the handler function, when initiated, may loop through a list of markers on a marker list (203), and examine whether the selected marker is visible inside the graphical user interface (e.g., the web browser window) (204). In one implementation, the handler function may use API calls supported by browser client applications (such as Element View or element position properties) to determine whether an element of the structured document is within the currently viewable window. If the marker is visible inside the graphical user interface, then the handler function may cause the client application (e.g., the web browser) to load the sub-set of the embedded objects corresponding to the marker into the structured document (205), and remove the marker from the marker list (206). In particular embodiments, if the marker is not currently visible in the graphical user interface the handler function may inspect the marker list to see whether there are more markers in the marker list to be examined (203). In particular embodiments, the handler function, after looping through the markers in the list, may determine whether there are markers remaining in the list (207). If there are no more markers in the marker list, the code object embedded in the page may remove the handler function (Step 208) as a subscriber to the onScroll and onResize events.

By way of example and not by way of limitation, an example HTML code segment of a structured document is provided below. The first code segment (pre-load) is a place marker included in an element of a table for an embedded photo before it is loaded into the web browser window. The second example section is the place marker for the embedded photo after it is loaded into the web browser window, with the embedded photo being shown as a background image.

embedded object from a remote host. When the handler function causes an embedded object to be loaded, it may change the place marker code as shown above to load the embedded object as a background image (background-image: url(http:// . . . ). In some embodiments, changing the code of the structured document in this manner causes the client application to send a request for the embedded object to a remote host and load in the response into the page when it is received. In particular embodiments, the embedded objects may be loaded into the structured document as background images into <div> or table elements having a fixed aspect ratio (e.g., 100×100 pixels). In one implementation, CSS rules declare all <i /> tags inside <a class="uiMediaThumb" /> tags have an aspect ratio of X by Y. In particular embodiments, the statically sized presentations may have a fixed aspect ratio, which may be or may not be of the same aspect ratio of the source objects. For example, by loading the embedded objects as background images, the statically sized presentations can be 100 by 100 pixels of thumbnail images of photos of various aspect ratios (e.g., 800 by 600, 800 by 800). In another implementation, the aspect ration of the place marker element may change depending on the aspect ratio of the corresponding image. For example, at initial generation of the structured document, a server process may access the aspect ratios of the embedded objects in the structured documents and size the corresponding place marker elements accordingly. In either situation, however, since the <div> or table element place marker code (both pre-load and post-load) has an aspect ratio that does not change, the size or position of the scroll bar does not change as the embedded objects are loaded in the page.

In particular embodiments, an optimization of the foregoing handler function may involve a delay to more efficiently handle situations where a user immediately scrolls to particular section of the structured document (such as the end portion). In a particular implementation, after an "onScroll" or "onResize" event, the handler function may wait for a prescribed period of time (such as 250 milliseconds or 500 milliseconds) before executing the operations of 203 to 208. For example, if a user scrolls down but quickly scrolls back to the top of the web page, then the viewable markers within the structured document may not have changed. In addition, if the user quickly scrolls to the bottom of the structured document, the handler function may cause

```
Pre-load:
<a class="uiMediaThumb uiMediaThumbHuge" href="http://[HTML_hyperlink_to_a_photo]"
title="title of photo">
    <i data-src="http://[remote_host]/photo.jpg"></i>
</a>
    Post-load:
<a class="uiMediaThumb uiMediaThumbHuge" href="http://[HTML_hyperlink_to_a_photo]"
title="title of photo">
    <i style="background-image: url(http://[remote_host]/photo.jpg);"></i>
</a>
```

Each pre-load place marker element includes a fixed aspect ratio and is an element rendered by the client application within the context of the structured document. Accordingly, even before the code object (such as an image) is actually loaded into the structured document, the final size of the structured document has been set. As the foregoing illustrates, the pre-load place marker code includes an URL for the embedded object as a "data-src" element, which does not cause the browser or client application to load the embedded objects associated with the bottom-most marker(s) to be loaded into the page.

An additional enhancement may involve a Javascript function that adds more place markers for additional embedded objects when the user has scrolled down to the end of the page. In such an embodiment, the function may add more embedded objects and place markers to the end of the structured document code and may also add more markers to the marker list, causing the handler function to operate as discussed above in response to on-scroll and re-size events.

Figure 3:
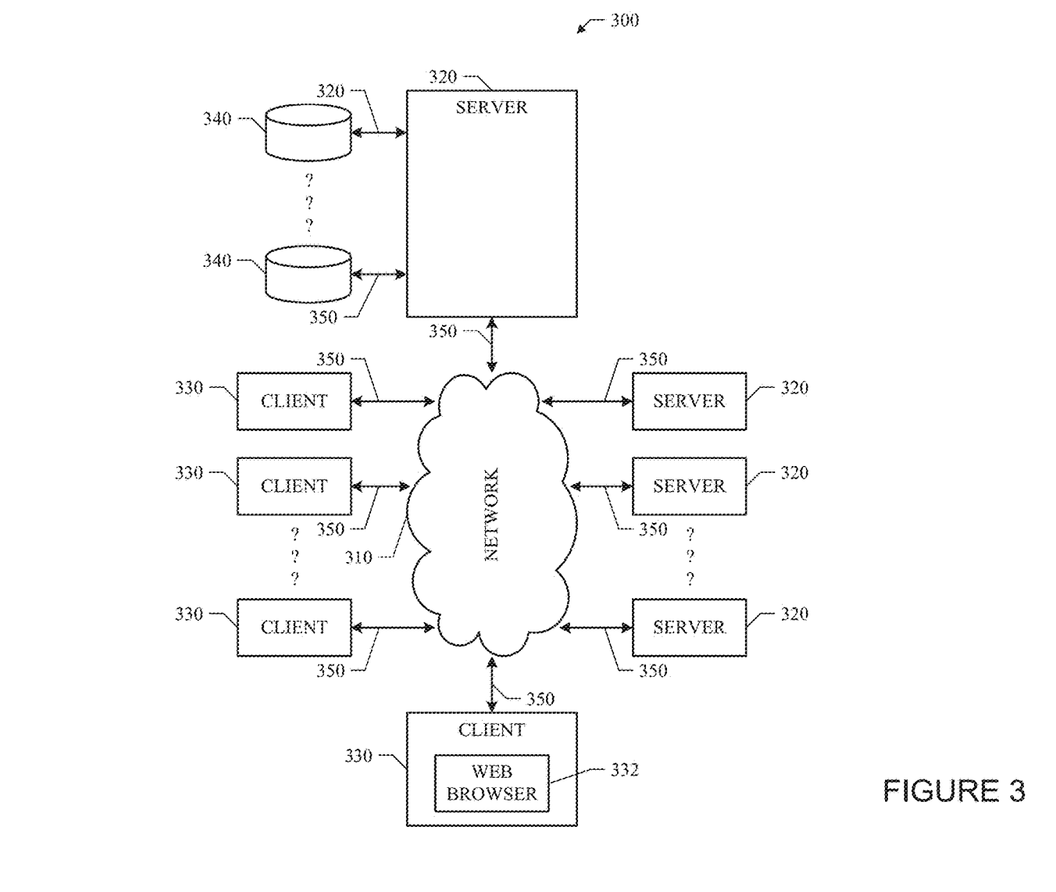
FIG. 3 illustrates an example network environment.

While the foregoing embodiments may be implemented in a variety of network configurations, the following illustrates an example network environment for didactic, and not limiting, purposes. FIG. 3 illustrates an example network environment 300. Network environment 300 includes a network 310 coupling one or more servers 320 and one or more clients 330 to each other. Network environment 300 also includes one or more data storage 340 linked to one or more servers 320. Particular embodiments may be implemented in network environment 300. For example, directory service 107 and social networking system frontend 104 may be written in software programs hosted by one or more servers 320. For example, event database 102 may be stored in one or more storage 340. In particular embodiments, network 310 is an intranet, an extranet, a virtual private network (VPN), a local area network (LAN), a wireless LAN (WLAN), a wide area network (WAN), a metropolitan area network (MAN), a portion of the Internet, or another network 310 or a combination of two or more such networks 310. The present disclosure contemplates any suitable network 310.

One or more links 350 couple a server 320 or a client 330 to network 310. In particular embodiments, one or more links 350 each includes one or more wired, wireless, or optical links 350. In particular embodiments, one or more links 350 each includes an intranet, an extranet, a VPN, a LAN, a WLAN, a WAN, a MAN, a portion of the Internet, or another link 350 or a combination of two or more such links 350. The present disclosure contemplates any suitable links 350 coupling servers 320 and clients 330 to network 310.

In particular embodiments, each server 320 may be a unitary server or may be a distributed server spanning multiple computers or multiple datacenters. Servers 320 may be of various types, such as, for example and without limitation, web server, news server, mail server, message server, advertising server, file server, application server, exchange server, database server, or proxy server. In particular embodiments, each server 320 may include hardware, software, or embedded logic components or a combination of two or more such components for carrying out the appropriate functionalities implemented or supported by server 320. For example, a web server is generally capable of hosting websites containing web pages or particular elements of web pages. More specifically, a web server may host HTML files or other file types, or may dynamically create or constitute files upon a request, and communicate them to clients 330 in response to HTTP or other requests from clients 330. A mail server is generally capable of providing electronic mail services to various clients 330. A database server is generally capable of providing an interface for managing data stored in one or more data stores.

In particular embodiments, one or more data storages 340 may be communicatively linked to one or more severs 320 via one or more links 350. In particular embodiments, data storages 340 may be used to store various types of information. In particular embodiments, the information stored in data storages 340 may be organized according to specific data structures. In particular embodiment, each data storage 340 may be a relational database. Particular embodiments may provide interfaces that enable servers 320 or clients 330 to manage, e.g., retrieve, modify, add, or delete, the information stored in data storage 340.

In particular embodiments, each client 330 may be an electronic device including hardware, software, or embedded logic components or a combination of two or more such components and capable of carrying out the appropriate functions implemented or supported by client 330. For example and without limitation, a client 330 may be a desktop computer system, a notebook computer system, a netbook computer system, a handheld electronic device, or a mobile telephone. The present disclosure contemplates any suitable clients 330. A client 330 may enable a network user at client 330 to access network 330. A client 330 may enable its user to communicate with other users at other clients 330.

A client 330 may have a web browser 332, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 330 may enter a Uniform Resource Locator (URL) or other address directing the web browser 332 to a server 320, and the web browser 332 may generate a Hyper Text Transfer Protocol (HTTP) request and communicate the HTTP request to server 320. Server 320 may accept the HTTP request and communicate to client 330 one or more Hyper Text Markup Language (HTML) files responsive to the HTTP request. Client 330 may render a web page based on the HTML files from server 320 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 4:
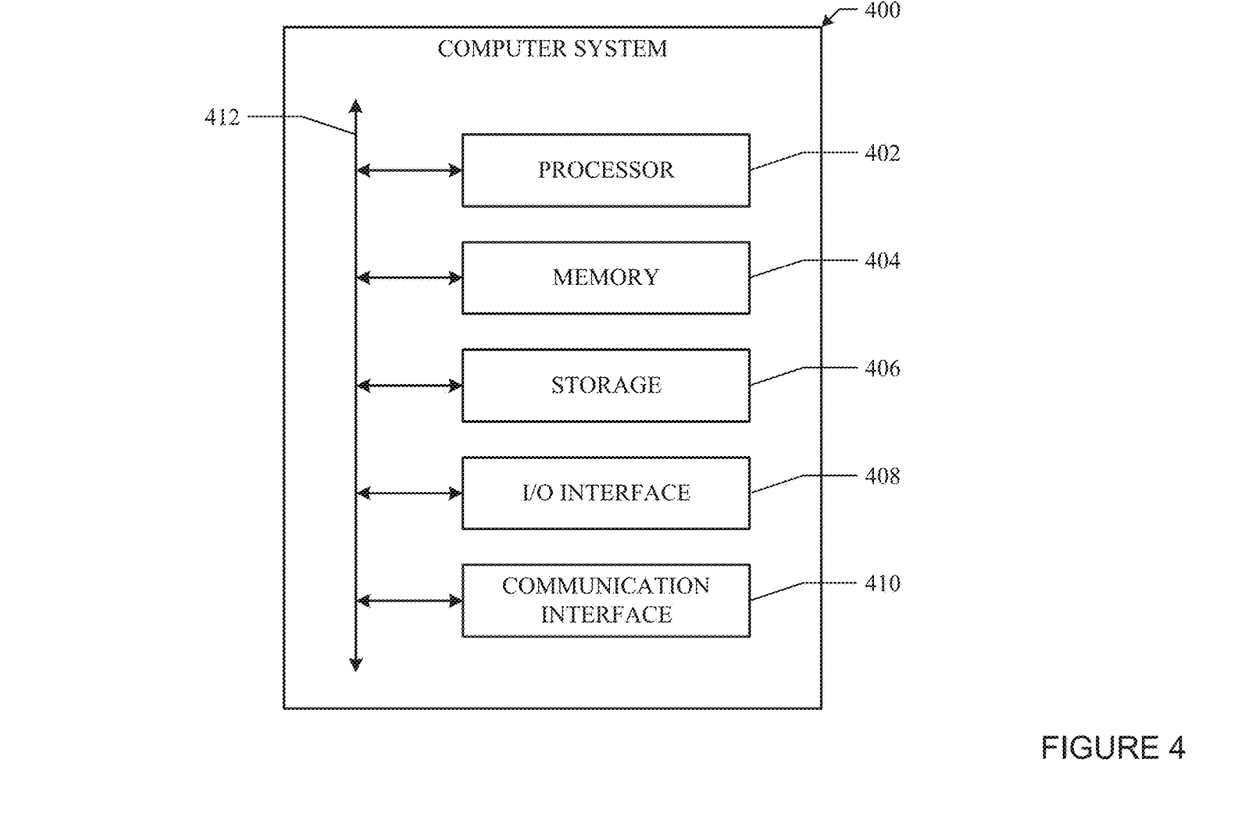
FIG. 4 illustrates an example computer system.

FIG. 4 illustrates an example computer system 400, which may be used with some embodiments of the present invention. This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. The present disclosure contemplates processor 402 including any suitable number of any suitable internal caches, where appropriate. As an example and not by way of limitation, processor 402 may include one or more instruction caches, one or more data caches, and one or more translation look-aside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. The present disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101.

This disclosure contemplates one or more computer-readable storage media implementing any suitable storage. In particular embodiments, a computer-readable storage medium implements one or more portions of processor 402 (such as, for example, one or more internal registers or caches), one or more portions of memory 404, one or more portions of storage 406, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
    by a computing device, receiving a structured document, wherein the structured document comprises (1) a list of markers and (2) place-marker elements corresponding to data objects of the structured document, wherein each marker in the list of markers corresponds to a subset of the place-marker elements;
    by the computing device, without loading all the data objects, determining a size of a scroll bar for a graphical user interface configured to display the structured document, wherein the determining of the size of the scroll bar is based at least in part on size information associated with the place-marker elements;
    by the computing device, detecting a scroll or resize event associated with the graphical user interface; and
    by the computing device, in response to detecting the scroll or resize event, executing an event handler function associated with the scroll or resize event, wherein the event handler function when executed is configured to:
        identify at least one marker in the list of markers whose corresponding subset of place-maker elements is within a portion of the structured document that is viewable through the graphical user interface;
        load the data objects corresponding to the subset of the place-marker elements corresponding to the identified marker; and
        remove the identified marker from the list of markers.

2. The method of claim 1, wherein each marker in the list of markers is a reference to or a flag associated with at least one of the place-marker elements in the corresponding subset of place-marker elements.

3. The method of claim 1, wherein the subset of place-marker elements corresponding to each marker in the list of markers is a row of place-marker elements.

4. The method of claim 3, wherein a select place-marker element positioned first in the row of place-marker elements is referenced by the corresponding marker.

5. The method of claim 1, further comprising:
by the computing device, upon initial loading of the structured document, registering the event handler function to handle scroll or resize events.

6. The method of claim 1, further comprising:
by the computing device, determining that the list of markers includes no marker; and
by the computing device, unregistering the event handler function from handling scroll or resize events.

7. The method of claim 1, wherein the event handler function when executed is further configured to:
delay executing operations of the event handler function for a prescribed period of time during the scroll or resize event; and
at the end of the prescribed period of time, determine that the portion of the structured document is viewable.

8. One or more computer-readable non-transitory storage media embodying software that is operable when executed to:
receive a structured document, wherein the structured document comprises (1) a list of markers and (2) place-marker elements corresponding to data objects of the structured document, wherein each marker in the list of markers corresponds to a subset of the place-marker elements;
without loading all the data objects, determine a size of a scroll bar for a graphical user interface configured to display the structured document, wherein the determining of the size of the scroll bar is based at least in part on size information associated with the place-marker elements;
detect a scroll or resize event associated with the graphical user interface; and
in response to detecting the scroll or resize event, execute an event handler function associated with the scroll or resize event, wherein the event handler function when executed is configured to:
identify at least one marker in the list of markers whose corresponding subset of place-maker elements is within a portion of the structured document that is viewable through the graphical user interface;
load the data objects corresponding to the subset of the place-marker elements corresponding to the identified marker; and
remove the identified marker from the list of markers.

9. The media of claim 8, wherein each marker in the list of markers is a reference to or a flag associated with at least one of the place-marker elements in the corresponding subset of place-marker elements.

10. The media of claim 8, wherein the subset of place-marker elements corresponding to each marker in the list of markers is a row of place-marker elements.

11. The media of claim 10, wherein a select place-marker element positioned first in the row of place-marker elements is referenced by the corresponding marker.

12. The media of claim 8, wherein the software is further operable when executed to:
upon initial loading of the structured document, register the event handler function to handle scroll or resize events.

13. The media of claim 8, wherein the software is further operable when executed to:
determine that the list of markers includes no marker; and
unregister the event handler function from handling scroll or resize events.

14. The media of claim 8, wherein the event handler function when executed is further configured to:
delay executing operations of the event handler function for a prescribed period of time during the scroll or resize event; and
at the end of the prescribed period of time, determine that the portion of the structured document is viewable.

15. A system comprising:
one or more processors; and
a memory coupled to the processors comprising instructions executable by the processors, the processors operable when executing the instructions to:
receive a structured document, wherein the structured document comprises (1) a list of markers and (2) place-marker elements corresponding to data objects of the structured document, wherein each marker in the list of markers corresponds to a subset of the place-marker elements;
without loading all the data objects, determine a size of a scroll bar for a graphical user interface configured to display the structured document, wherein the determining of the size of the scroll bar is based at least in part on size information associated with the place-marker elements;
detect a scroll or resize event associated with the graphical user interface; and
in response to detecting the scroll or resize event, execute an event handler function associated with the scroll or resize event, wherein the event handler function when executed is configured to:
identify at least one marker in the list of markers whose corresponding subset of place-maker elements is within a portion of the structured document that is viewable through the graphical user interface;
load the data objects corresponding to the subset of the place-marker elements corresponding to the identified marker; and
remove the identified marker from the list of markers.

16. The system of claim 15, wherein each marker in the list of markers is a reference to or a flag associated with at least one of the place-marker elements in the corresponding subset of place-marker elements.

17. The system of claim 15, wherein the subset of place-marker elements corresponding to each marker in the list of markers is a row of place-marker elements.

18. The system of claim 15, wherein the processors are further operable when executing the instructions to:
upon initial loading of the structured document, register the event handler function to handle scroll or resize events.

19. The system of claim 15, wherein the processors are further operable when executing the instructions to:
determine that the list of markers includes no marker; and
unregister the event handler function from handling scroll or resize events.

20. The system of claim 15, wherein the event handler function when executed is further configured to:

delay executing operations of the event handler function for a prescribed period of time during the scroll or resize event; and at the end of the prescribed period of time, determine that the portion of the structured document is viewable.

* * * * *